(12) United States Patent
Armbruster et al.

(10) Patent No.: US 6,227,342 B1
(45) Date of Patent: May 8, 2001

(54) MOTORCYCLE CLUTCH SYSTEM

(76) Inventors: Frederick K. Armbruster, 44307 Gallipoli Pl., Hemet, CA (US) 92544; William A. Neal, III, 4771 Aragon Dr., San Diego, CA (US) 92115

(*) Notice: Subject to any disclaimer, the term of this patent is extended or adjusted under 35 U.S.C. 154(b) by 0 days.

(21) Appl. No.: 09/419,269

(22) Filed: Oct. 15, 1999

Related U.S. Application Data

(63) Continuation of application No. 09/346,768, filed on Jul. 1, 1999.
(60) Provisional application No. 60/094,400, filed on Jul. 28, 1998.

(51) Int. Cl.[7] ................................................. F16D 25/00
(52) U.S. Cl. .................... 192/85 R; 192/85 C; 192/91 R
(58) Field of Search .............................. 192/85 C, 91 R, 192/85 R

(56) References Cited

U.S. PATENT DOCUMENTS

| | | | |
|---|---|---|---|
| 3,899,057 | * | 8/1975 | Carre ..................................... 192/351 |
| 3,935,930 | * | 2/1976 | Kine ....................................... 188/344 |
| 4,560,049 | * | 12/1985 | Uchibaba et al. ................. 192/85 R |
| 4,566,577 | * | 1/1986 | Tsuboi ................................ 192/96 X |

OTHER PUBLICATIONS

Mangura HS–22 Classic Hydra Stop Brake, Bike Pro Catalog, 1996, p. 63.*

* cited by examiner

*Primary Examiner*—Charles A Marmor
*Assistant Examiner*—Saúl Rodríguez
(74) *Attorney, Agent, or Firm*—Loyal McKinley Hanson

(57) ABSTRACT

A hydraulic clutch assembly for a motorcycle having a handlebar, an engine, and a clutch, includes a master hydraulic cylinder assembly, a slave hydraulic cylinder assembly, and a hydraulic line adapted to communicate hydraulic fluid pressure between the two hydraulic cylinder assemblies. The master hydraulic cylinder assembly is adapted to be mounted on the handlebar of the motorcycle and it includes a clutch lever portion that is adapted to actuate the master cylinder assembly. The slave hydraulic cylinder assembly is adapted to be mounted on the engine of the motorcycle and to pull on the clutch when actuated in the place of a conventional clutch cable. The hydraulic line is adapted to communicate hydraulic fluid pressure between the master cylinder assembly and the slave hydraulic cylinder assembly so that pulling the clutch lever portion of the master hydraulic cylinder assembly actuates the slave hydraulic cylinder assembly and causes it to pull on and disengage the clutch.

4 Claims, 6 Drawing Sheets

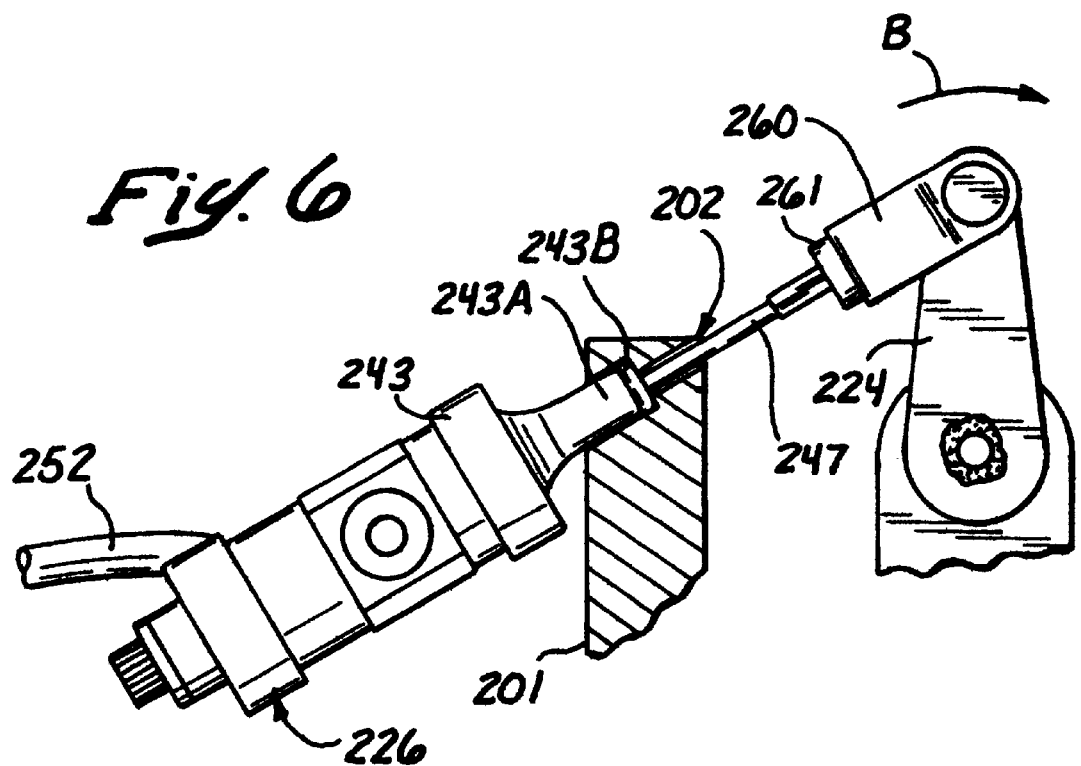
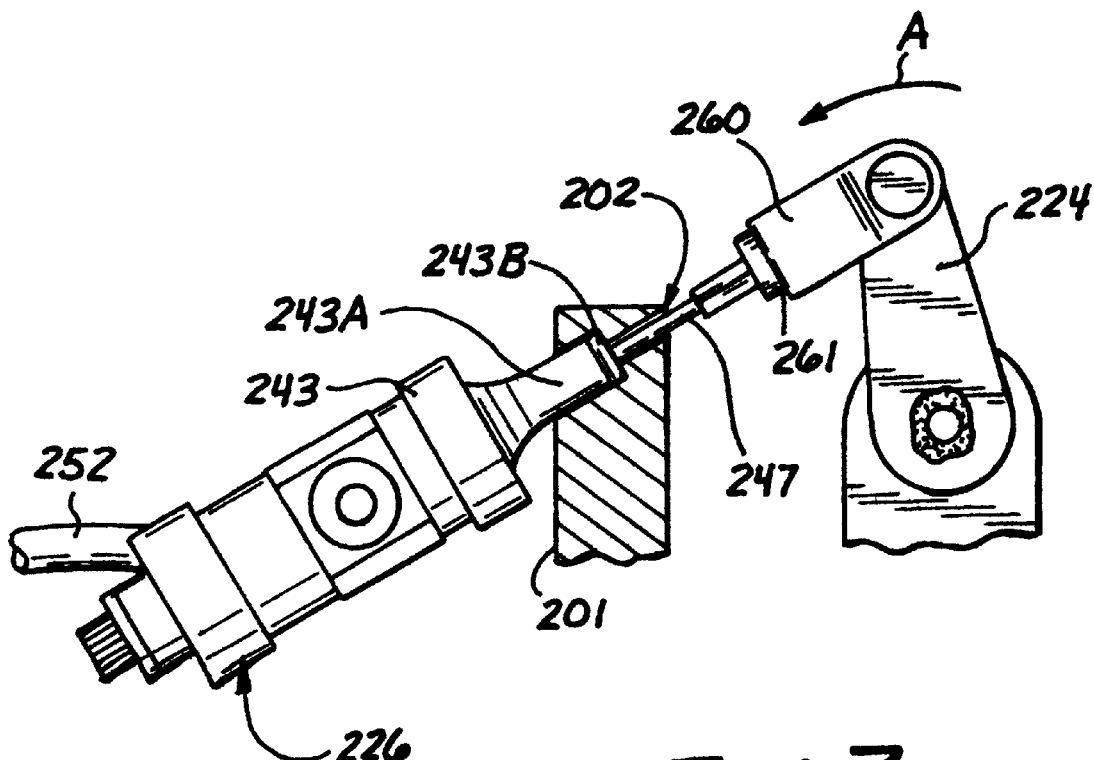

ional application filed by the same inventors that
MOTORCYCLE CLUTCH SYSTEM

CROSS-REFERENCE TO RELATED APPLICATIONS

This application is a continuation in part of the copending U.S. patent application by the same inventors that was filed Jul. 1, 1999 and assigned Ser. No. 09/346,768 (the parent application), which parent application claimed priority of the provisional application filed by the same inventors that was filed Jul. 28, 1998 and assigned Ser. No. 60/094,400.

BACKGROUND OF THE INVENTION

1. Technical Field

This invention relates generally to motorcycles, and more particularly to a motorcycle clutch system.

2. Description of Related Art

An existing motorcycle clutch system includes a clutch lever located at the handlebar and means for mechanically coupling movement of the clutch lever to the clutch assembly located at the engine. It does so with a clutch cable that spans the distance between the clutch lever and the clutch assembly. The clutch cable is of known design, having an inner wire disposed coaxially within a tubular flexible outer casing so that the inner wire can move axially within the outer casing to mechanically couple movement of the clutch lever to the clutch assembly.

Pulling the clutch lever toward the handlebar pulls the inner wire of the clutch cable away from the clutch assembly to thereby disengage the clutch. Releasing the clutch lever allows the inner wire of the clutch cable to move back toward the clutch assembly to thereby allow the spring-biased clutch to re-engage.

Motorcycle racing enthusiasts and other owners know that various drawbacks accompany the clutch cable design. For one thing, the clutch cable causes parasitic drag. In addition, it degrades and must be replaced. Furthermore, it requires frequent readjustment to compensate for swelling of the clutch plates and for wear. Thus, motorcycle racing enthusiast and other owners and manufacturers seek some way to address those concerns.

SUMMARY OF THE INVENTION

This invention addresses the concerns outlined above by providing a hydraulic motorcycle clutch system that can be retrofitted to an existing motorcycle originally manufactured with a clutch cable. The retrofit hydraulic clutch system includes (i) a handlebar mountable clutch lever assembly with a master hydraulic cylinder, (ii) a slave hydraulic cylinder assembly adapted to be mounted on the engine and attached to the clutch assembly, and (iii) a hydraulic line adapted to span the distance between the master and slave hydraulic cylinders in order to maintain them in fluid communication.

Thus, the invention alleviates many concerns associated with clutch cables by providing a hydraulic clutch system that is suitable in its broader aspects for retrofitting to many existing motorcycles. It causes less parasitic drag. It is less prone to degrade. It is easier and more sensitive to operate. It allows clutch lever positioning, immediate clutch response, and unchanged clutch lever feel as the clutch gets hot. It eliminates frequent readjustment to compensate for swelling of the clutch plates and for wear. It actually self adjusts.

To paraphrase some of the more precise language subsequently presented in the claims, a motorcycle clutch assembly constructed according to the invention for a motorcycle having a handlebar, a clutch lever, a clutch cable, an engine, and a clutch, includes (i) a master hydraulic cylinder assembly, (ii) a slave hydraulic cylinder assembly, and (iii) a hydraulic line adapted to communicate hydraulic fluid pressure between the two hydraulic cylinder assemblies. The master cylinder assembly is adapted to be mounted on the handlebar of the motorcycle in place of the clutch lever and it includes a integral clutch lever portion that is adapted to actuate a master cylinder portion of the assembly. The slave hydraulic cylinder assembly is adapted to be mounted on the engine of the motorcycle, to be attached to the clutch arm, and to pull on the clutch in the place of the clutch cable so that it pulls in the same general direction that the clutch cable was designed to do. The hydraulic line is adapted to communicate hydraulic fluid pressure between the master cylinder assembly and the slave hydraulic cylinder assembly so that pulling the moveable lever actuates the slave hydraulic cylinder assembly and causes it to pull on and disengage the clutch.

One embodiment takes the form of a retrofit kit that includes replacement cylinder head mounting nuts for securing a mounting bracket to the engine of a YAMAHA KF400FK1 forward of the clutch arm (or pushlever) in the place of the original clutch cable. The slave hydraulic cylinder mounting bracket supports the slave hydraulic cylinder so that it functions the same as a clutch cable from the viewpoint of the clutch assembly, in the sense that it pulls the clutch arm on the YZ400FK1 clutch assembly in the same relative direction as the clutch cable it replaces. Another embodiment retrofits on various HONDA, SUZUKI, and YAMAHA models having a clutch arm within an engine case. The slave cylinder assembly includes a piston pull rod adapted to extend through a clutch cable entranceway in the engine case so that the slave cylinder assembly bears against the case in order to thereby retain it in place without additional mounting hardware. The following illustrative drawings and detailed description make the foregoing and other objects, features, and advantages of the invention more apparent.

BRIEF DESCRIPTION OF THE DRAWINGS

FIG. 6 is an enlarged view of the pull-type slave hydraulic cylinder assembly and the clutch lever assembly of the second embodiment with the clutch engaged; and FIG. 7 is an enlarged view similar to FIG. 6 with the clutch disengaged.

DESCRIPTION OF THE PREFERRED EMBODIMENTS

The following description begins by restating the description of the prior art and a first embodiment of the invention shown in FIGS. 1–4 contained in the parent application (Ser. No. 09/094,400). The description then proceeds by describing a second embodiment shown in FIGS. 5–7 (new matter of this continuation-in-part application). A reader already familiar with the specification and FIGS. 1–4 of the parent application may proceed directly to the description of the second embodiment.

Prior Art and First Embodiment

Figure 1:
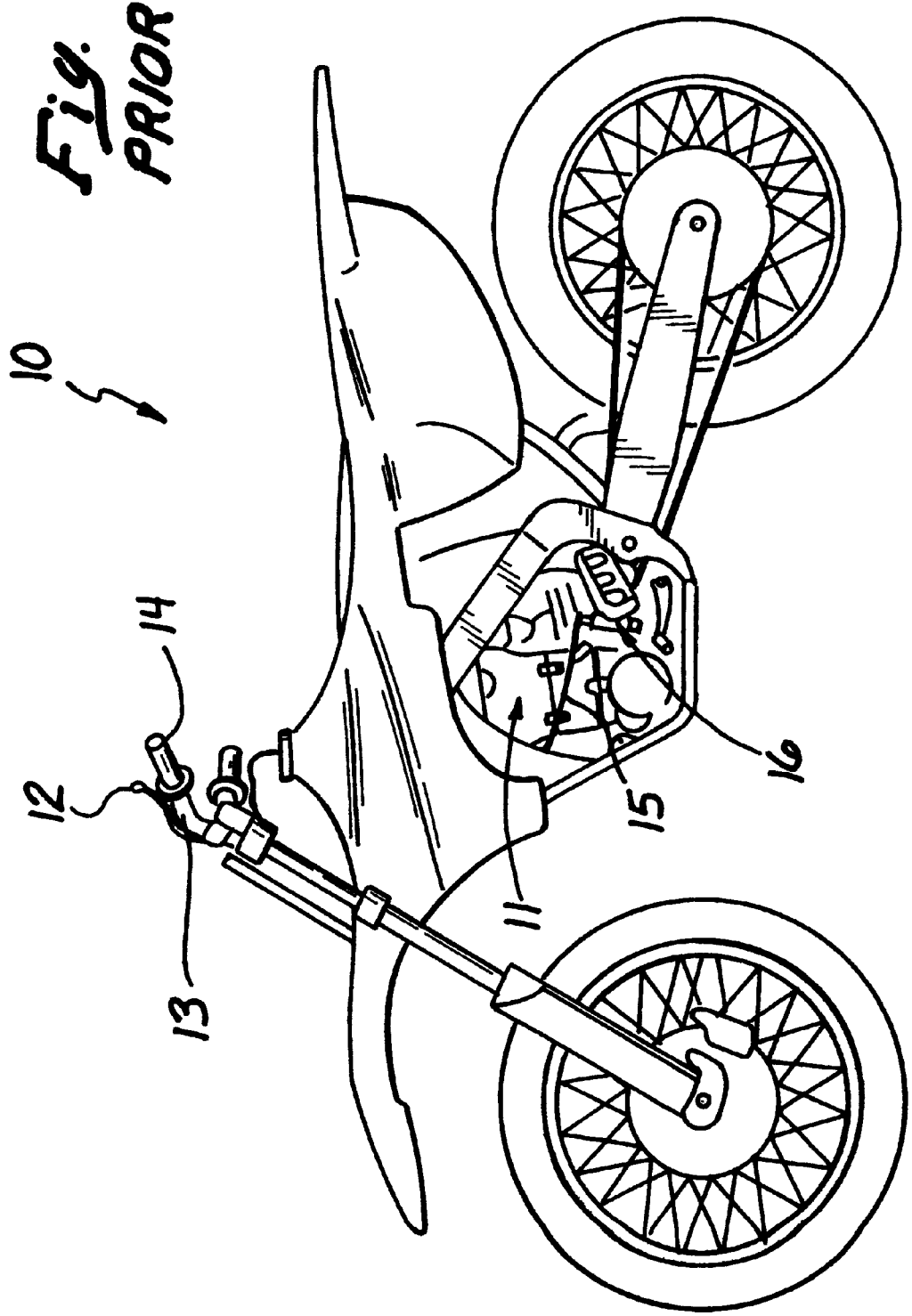
FIG. 1 of the drawings is a side view of a prior art YAMAHA YZ400FK1 motorcycle before the installation of a retrofit hydraulic clutch system constructed according to the invention.
Figure 2:
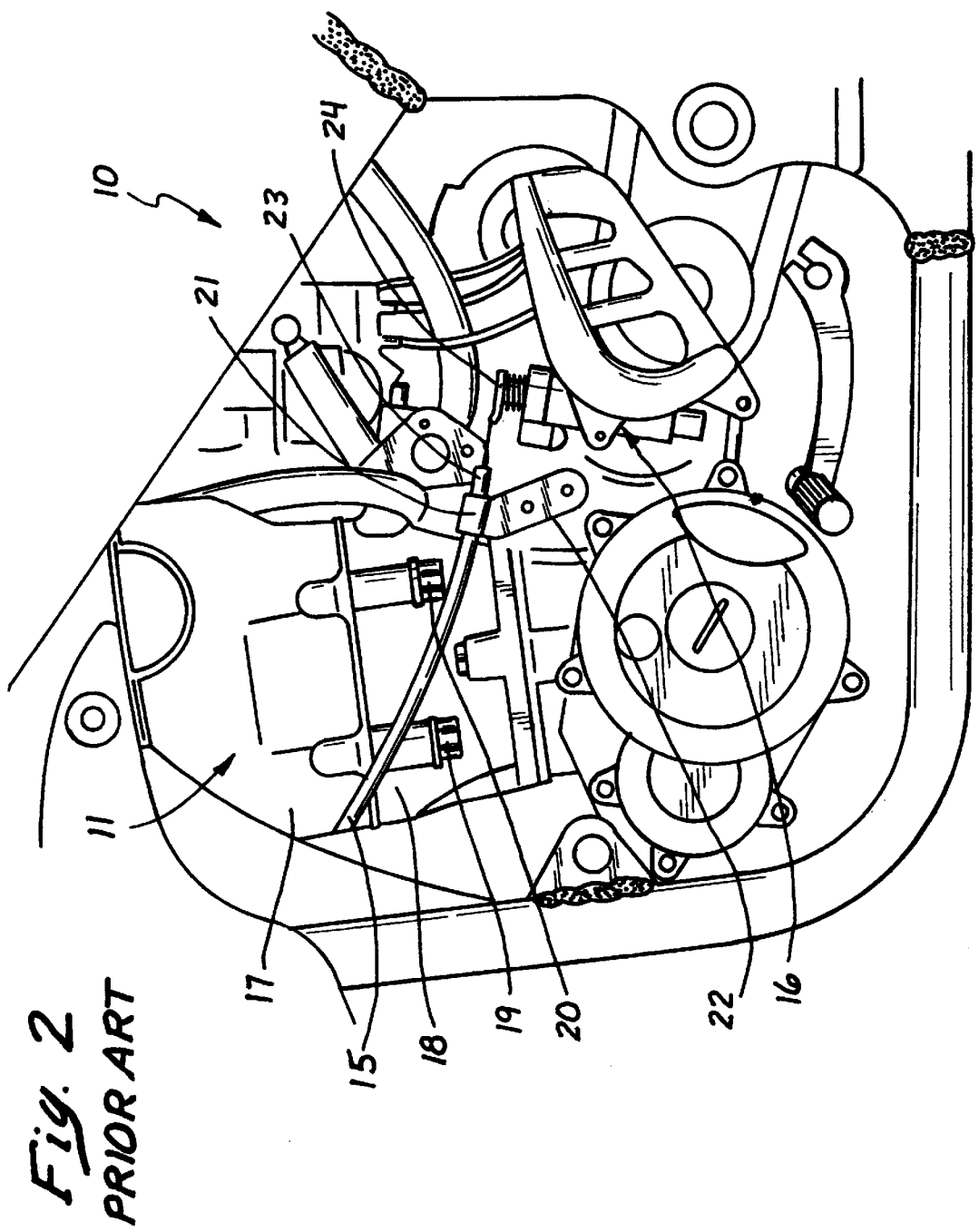
FIG. 2 is an enlarged side view of the mid portion of the prior art motorcycle showing the location of the clutch cable, clutch assembly, and cylinder head mounting nuts.
Figure 3:
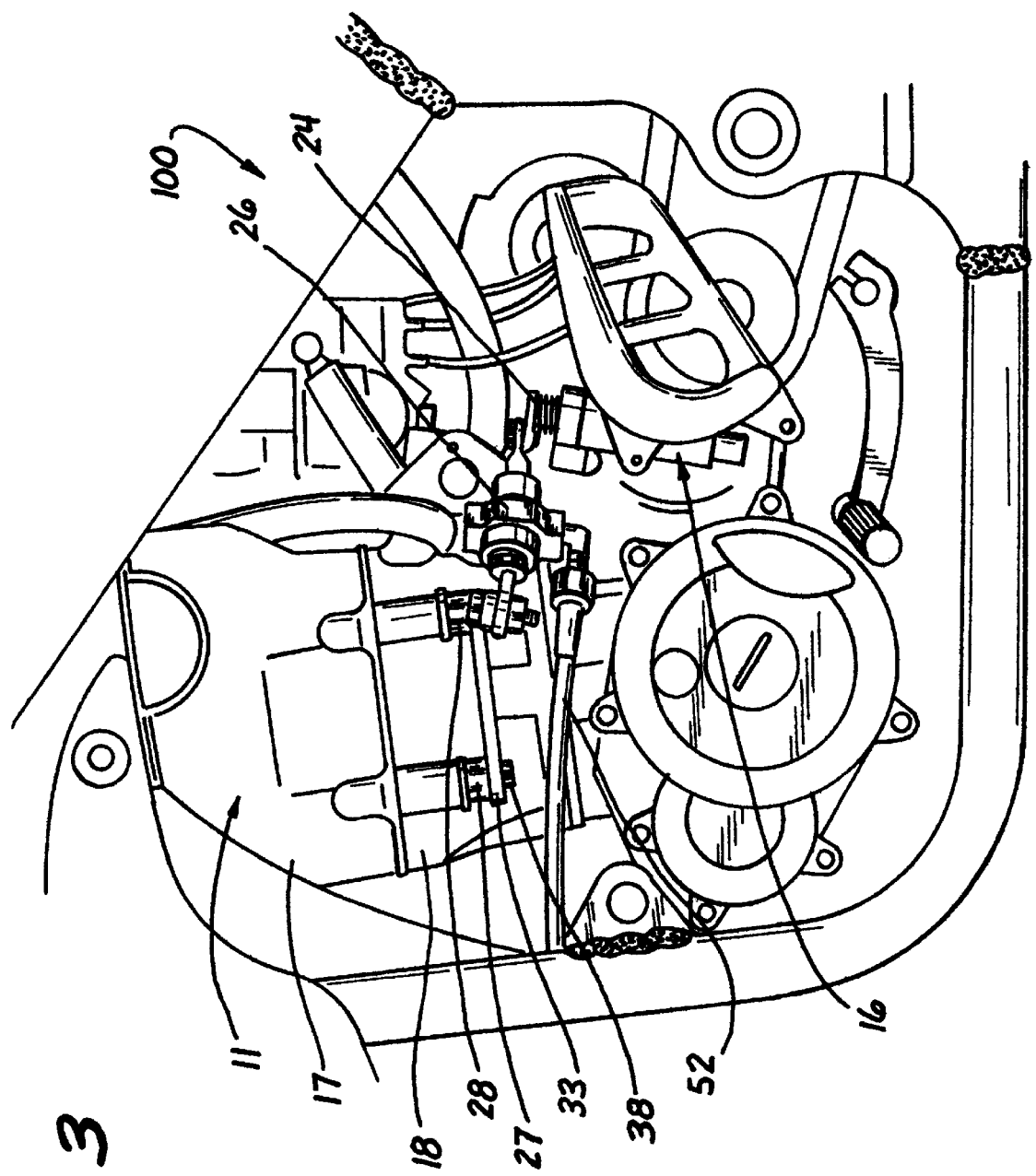
FIG. 3 is an enlarged side view similar to FIG. 2, but after installation of the retrofit hydraulic clutch assembly.

Referring first to FIGS. 1 and 2, they show a prior art YAMAHA YZ400FK1 motorcycle 10 before installation of a retrofit hydraulic clutch system constructed according to the invention. The YZ400KF1 is a well known commercially available motocross machine with a 4-stroke, liquid cooled, 400 cc, 5-valve, dual-overhead cam, dry-sump engine that is designated generally by reference numeral 11. The YZ400KF1 is shown in the drawings in order to describe a preferred embodiment of the invention, although the broader aspects of the invention may be applied to any of various other motorcycles. Further details of construction for the YZ400KF1 model appear in various publications, including the YZ400KF1 Owner's Service Manual that is available from Yamaha Motor Corporation, U.S.A.

Similar in some respects to many other existing motorcycles, the motorcycle 10 includes a clutch lever 12 that is mounted on a handlebar 13 forward of a left grip 14 (FIG. 1). From that position the clutch lever 12 is coupled via a clutch cable 15 (FIGS. 1 and 2) to a clutch assembly 16 disposed rearwardly of the engine 11. Pulling the clutch lever 12 toward the left grip 14 of the handlebar 13 pulls an inner wire of the clutch cable 15 forwardly away from the clutch assembly 16 in a known way to thereby disengage a spring-biased clutch that is a portion of the clutch assembly 16. Releasing the clutch lever 12 allows the inner wire of the clutch cable 15 to move back toward the clutch assembly 16 in a well known way to thereby allow the clutch to re-engage.

Considering FIG. 2 in further detail, the engine 11 includes a cylinder head 17 mounted atop a cylinder 18 by two hexhead cylinder head mounting nuts 19 and 20, in addition to other nuts not shown or of consequence to this description. The nut 19 may be referred to as a forward leftside cylinder head mounting nut, and the nut 20 may be referred to as a rearward leftside cylinder head mounting nut. As called out in the YZ400FK1 Owner's Service Manual, the nuts 19 and 20 are metric M6×1.0 nuts with a standard I.S.O. pitch thread (6 mm thread diameter and one thread per millimeter) and oppositely disposed hexhead flats spaced ten millimeters apart. The cylinder head mounting nuts 19 and 20 screw onto threaded studs (not shown) that are attached to the cylinder head 17 and function to hold the cylinder head 17 in place on the cylinder 18.

A clutch cable retaining bracket 21 is bolted or otherwise mounted on a lower portion 22 of the engine 11 where it secures a rearward end portion 23 of the clutch cable 15 in fixed relationship to a pivotable pushlever 24. The pushlever 24 is part of the clutch assembly 16 and it causes the clutch to disengage when it is pivoted by action of the clutch cable 15 pulling forwardly on it, as occurs when the clutch lever 12 is pulled toward the left grip 14.

A retrofit hydraulic clutch assembly 25 (or retrofit kit) constructed according to the invention (FIG. 4) replaces the clutch cable 15 with a slave hydraulic cylinder assembly 26 (FIGS. 3 and 4) that pulls the pushlever 24 the same way as the clutch cable 15 did before the retrofit. Before installing the retrofit hydraulic clutch assembly 25, the installer performing the retrofit removes the clutch cable retainer bracket 21 shown in FIG. 2, the clutch cable 15, the clutch lever 12, and the two cylinder head mounting nuts 19 and 20. That readies the motorcycle 10 for installation of the retrofit hydraulic clutch assembly 25.

Next, the installer locates two replacement nuts 27 and 28 that are part of the retrofit hydraulic clutch assembly 25, and he then screws the two replacement nuts 27 and 28 onto the cylinder head threaded studs in the place of the original cylinder head mounting nuts 19 and 20 (FIG. 3), torquing them down just as he would the original nuts 19 and 20. The two replacement nuts 27 and 28 function as the original cylinder head mounting nuts 19 and 20 while providing additional structure that is used for mounting the slave hydraulic cylinder assembly 26. The nut 27 includes a main body portion 29 and additional structure in the form of a post portion 30. Similarly, the nut 28 includes a main body portion 31 and additional structure in the form of a post portion 32.

The nuts 27 and 28 are identical and so only further details of the replacement nut 27 is described in further in detail. The main body portion 29 has generally the same physical dimensions and thread size as the original cylinder head mounting nut 19, with a hexhead and a threaded bore that extends fully through the post portion 30. The post portion 30 is a cylindrically shaped protrusion having a $9/32$-inch outside diameter and an axial length slightly less than $3/16$ inch (i.e., it protrudes just under $3/16$ inch axially beyond the main body portion 29). It serves as a mounting for a slave cylinder mounting bracket 33 (FIGS. 3 and 4) that is also part of the retrofit hydraulic clutch assembly 25.

The slave cylinder mounting bracket 33 is a rigid component formed from aluminum or other suitable material to include a $3/16$-inch thick by $1/2$-inch wide first section or bar portion 34 (FIG. 4) measuring $3 3/8$ inches long, and a $1/2$-inch wide second section or arm portion 35 that protrudes at a right angle from the bar portion 34. Two $5/16$-inch diameter holes 36 and 37 in the bar portion 34 have diameters just slightly larger than the outside diameters of the post portions 30 and 32 of the replacement nuts 27 and 28. The holes 36 and 37 are spaced apart on 73-millimeter centers so that they fit onto the post portions 30 and 32 in the position illustrated in FIG. 3, with the arm portion 35 of the slave cylinder mounting bracket 33 disposed rearwardly toward the pushlever 24 of the clutch assembly 16. Bolts 38 and 39 extend through washers 40 and 41 and screw into the post portions 30 and 32 to secure the slave cylinder mounting bracket 33 in place.

After mounting the slave cylinder mounting bracket 33 on the engine 11 as described above, the installer secures the slave hydraulic cylinder assembly 26 to the slave cylinder mounting bracket 33 and to the pushlever 24. The arm portion 35 of the slave cylinder mounting bracket 33 is offset about 15 to 25 degrees (preferably 23 degrees), as indicated by a double headed arrow A in FIG. 4, to better align the slave hydraulic cylinder assembly 26 with an lever portion 42 of the pushlever 24.

The installer secures a cylinder portion 43 of the slave hydraulic cylinder assembly 26 to the arm portion 35 with a bolt-and-nut combination 44 that extends through a hole 45 in the arm portion 35 and through a floating ball arrangement 46 connected to the cylinder portion 43 to form a ball joint that enables the slave hydraulic cylinder assembly 26 to pivot and swivel into alignment. The installer then secures a piston portion 47 of the slave hydraulic cylinder assembly 26 to the lever portion 42 using a bolt-and-nut combination 48 through a loose fit bushing 49 so that the pushlever 24 is free to pivot normally about a pivotal axis 50. (FIG. 4).

As a further idea of size, the cylinder portion 43 of the slave hydraulic cylinder assembly 26 measures between ¾ inch and ⅞ inch in diameter at various points along its length, and the piston portion 47 travels a maximum of about ½ inch between its position when fully within the cylinder portion 43 and its position when fully withdrawn. The corresponding center-to-center distances between the bolt-and-nut combination 44 and the bolt-and-nut combination 48 are about 3¾ inches and 4¼ inches. This gives sufficient leeway to adjust for proper clutch operation in response to actuation of the slave hydraulic cylinder assembly 26.

After installing the slave hydraulic cylinder assembly 26, the installer locates a master hydraulic cylinder assembly 51 (FIG. 4) that is part of the retrofit hydraulic clutch assembly 25. Next, he mounts it on the handlebar 13 in place of the original clutch lever 13 that he previously removed. Then, the installer locates a hydraulic line 51 that is part of the retrofit hydraulic clutch assembly 25 and he routes it from the master hydraulic cylinder assembly 51 to the slave hydraulic cylinder assembly 26, attaching it then to both the master hydraulic cylinder assembly 51 and the slave hydraulic cylinder assembly 26 using suitable fittings included on those components for that purpose. Preferably, he routes the hydraulic line along the original routing of the clutch cable 15 that he previously removed. However, the hydraulic line 52 is illustrated somewhat lower than the original routing for illustrative convenience, in order not to obstruct a reader's view of the slave cylinder mounting bracket 33 in the drawings.

Figure 4:
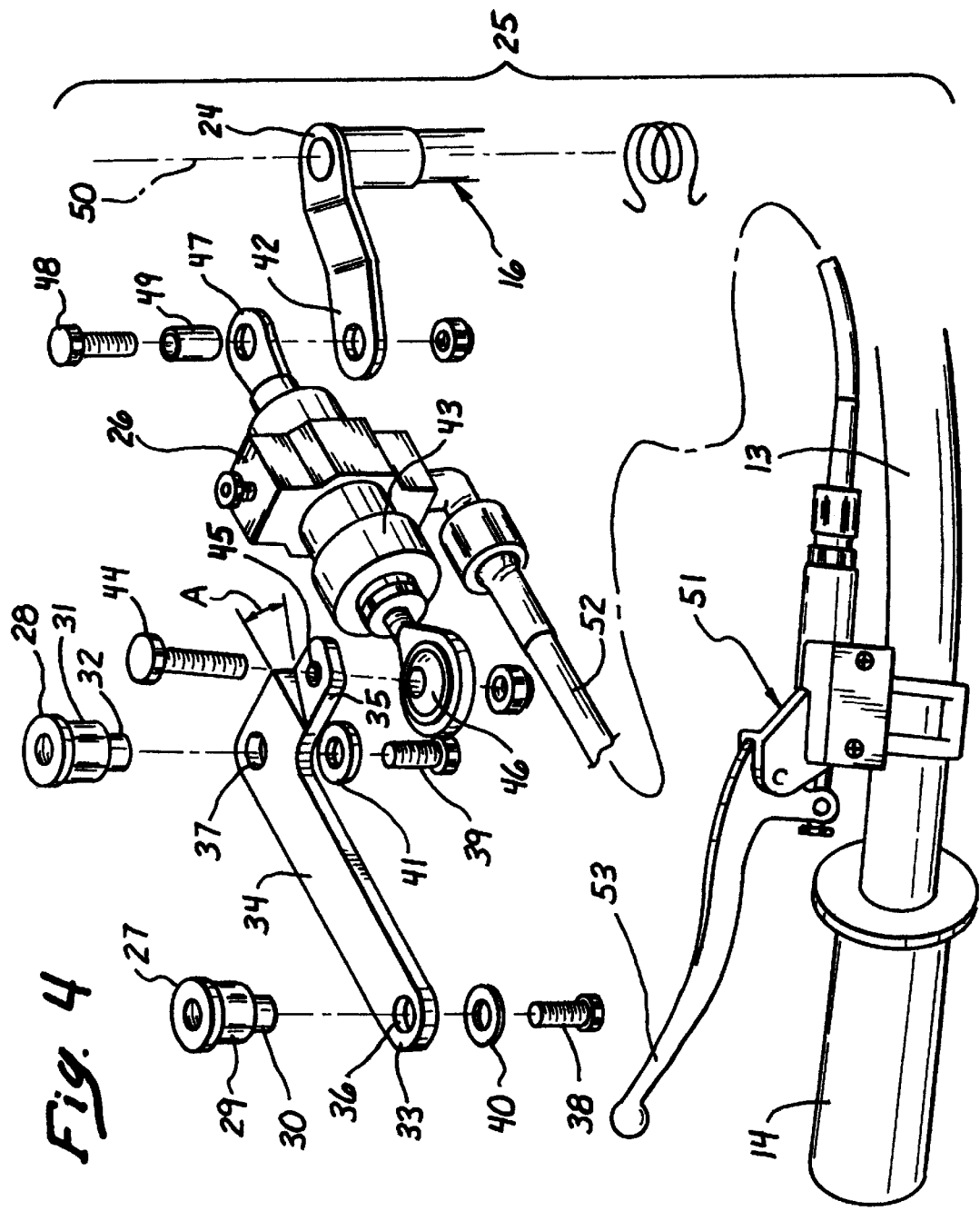
FIG. 4 is a disassembled view of the slave hydraulic cylinder assembly and the clutch lever assembly, showing their interconnection diagrammatically.

The foregoing retrofits the motorcycle 10 with the retrofit hydraulic clutch assembly 25 to result in the motorcycle 100 illustrated in FIG. 4, which, apart from the retrofit, is the same motorcycle as the motorcycle 10. Pulling a clutch lever 53 that is depicted in FIG. 4 as part of the master cylinder assembly 51, forces hydraulic fluid from the master hydraulic cylinder assembly 51 through the hydraulic line 52 to the slave hydraulic cylinder assembly 26. In other words, the master hydraulic cylinder assembly 51, the hydraulic line 52, and the slave hydraulic cylinder assembly 26 contain hydraulic fluid, and the hydraulic line 52 communicates hydraulic fluid pressure between the two hydraulic cylinder assemblies in a well known way to thereby causes the piston portion 47 of the slave hydraulic cylinder assembly 26 to pull on the lever portion 42 of the pushlever 24 in response to the clutch lever 53 being pulled. The pushlever 24 then pivots about the pivotal axis 50 in response, thereby causing the clutch of the clutch assembly 16 to disengage. Releasing the clutch lever 53 allows the clutch to re-engage.

The master hydraulic cylinder assembly 51 may take any of various forms, including one of the master cylinder assemblies available from Magura GMBH of Germany. The hydraulic line 52 may also take any of various forms, including one of the hydraulic lines available from Earl's Performance Products of Long Beach, Calif. A suitable slave hydraulic cylinder assembly may be obtained from Neal Performance Products, Inc. of San Diego, Calif. (see, for example, the specifications in the accompanying FIGS. 5–11), although any of various other slave hydraulic cylinder designs may be adapted to the task without departing from the broader inventive concepts described and claimed, namely: a motorcycle engine mountable slave hydraulic cylinder that can be retrofitted to an existing motorcycle so that it pulls on a clutch component in the place of a clutch cable to disengage the clutch.

Second Embodiment

Figure 5:
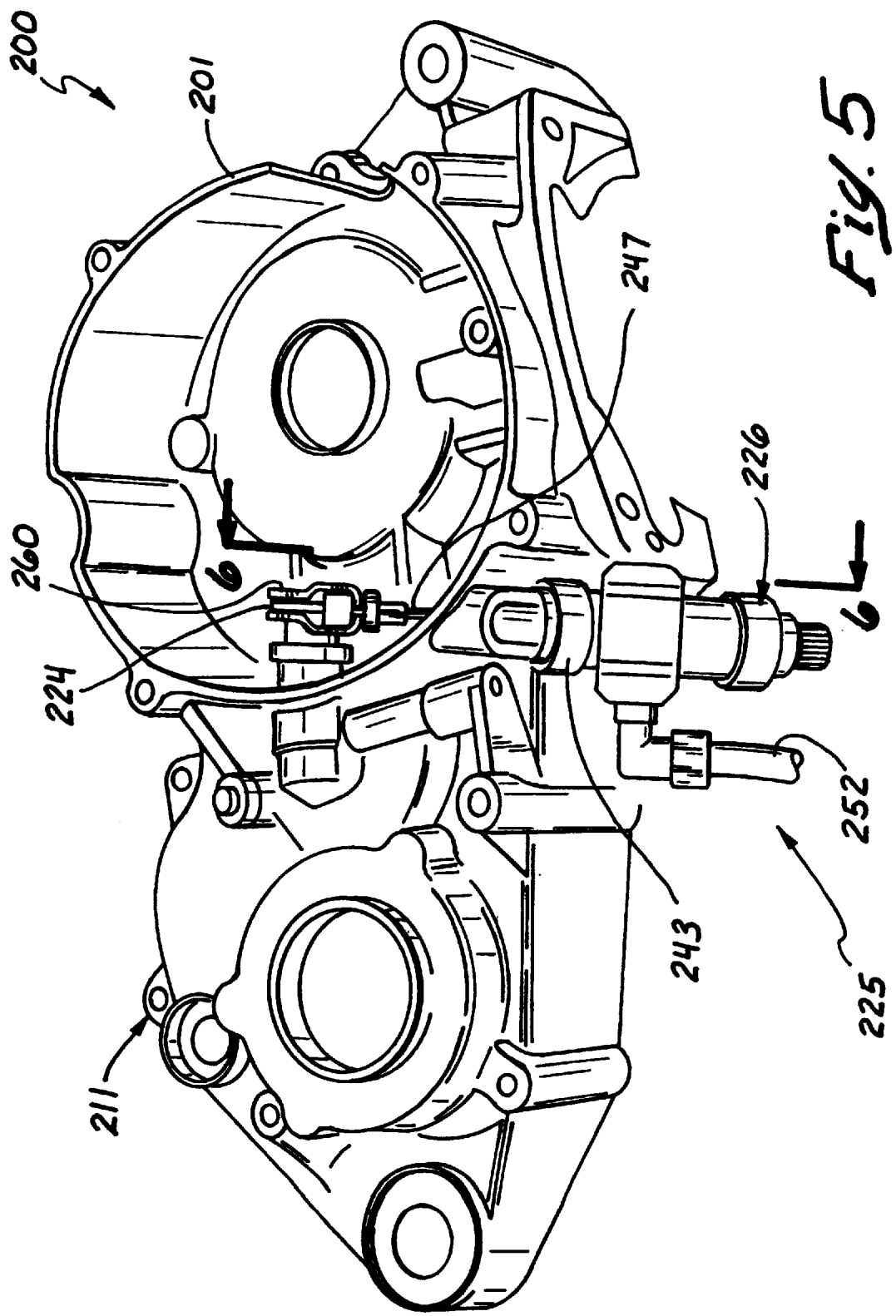
FIG. 5 shows a second embodiment of the invention installed on a Honda CR500 model motorcycle.

Turning now to FIGS. 5–7, they illustrate various aspects of a retrofitted motorcycle 200 constructed according to the invention. The motorcycle 200 represents a HONDA CR500, although the inventive concepts may be applied to any of various motorcycle models having a clutch arm within an engine case without departing from the claims (including HONDA models CR125 and CR250, SUZUKI models RM125 and RM250, and YAMAHA model YZ250). The motorcycle 200 is similar in many respects to the motorcycle 100, and so only differences are described in further detail. For convenience, reference numerals designating parts of the motorcycle 200 are increased by two hundred over those designating parts of the motorcycle 100. In addition, only a portion of the engine 211 of the motorcycle 200 is shown in order to focus on the engine case 201 and the retrofit hydraulic clutch assembly 225. A master hydraulic cylinder assembly is not shown because it is similar to the master hydraulic cylinder assembly 51 in FIG. 4.

One difference in the originally manufactured equipment on the motorcycle 200 (compared to that of the motorcycle 100) is that the clutch arm 224 (FIGS. 5–7) is within the engine case 201. The engine case 201 is engine structure that forms a compartment in which the clutch arm 224 is located, and it includes a cover (not shown) that has been omitted in FIG. 5 in order to show the clutch arm 224 on the interior of the engine case 201. The engine case 201 includes a clutch cable entranceway 202 (FIGS. 6 and 7) that is a small opening in the engine case 201 providing a passageway through which the original clutch cable extended.

The slave hydraulic cylinder assembly 226 of the retrofit hydraulic clutch assembly 225 has been installed on the motorcycle 200 in place of the original clutch cable by first removing the original clutch cable. The slave hydraulic cylinder assembly 226 includes a cylinder portion 243 from which a piston pull rod 247 extends. The slave hydraulic cylinder assembly 226 was positioned so that a first or forward portion 243A of the cylinder 243 is seated within the entranceway 202, with the piston pull rod 247 portion extending through the entranceway 202. The forward portion 243A is adapted to seat within the entranceway 202 (i.e., it is suitably sized and shaped to fit within the existing entranceway 202) and it is preferably provided with an O-ring seal 243B (FIGS. 6 and 7) for sealing and cushioning purposes.

The slave hydraulic cylinder assembly 226 of the retrofit hydraulic clutch assembly 225 includes a connector 260 that couples the piston pull rod 247 to the clutch arm 224. When the user actuates the master hydraulic cylinder assembly by squeezing the clutch lever on the handlebar, the piston pull rod 247 of the slave hydraulic cylinder assembly 226 pulls the clutch arm 224 (as depicted by an arrow A in FIG. 7) to thereby disengage the clutch. When the clutch lever is released, the clutch arm 224 returns to the at rest position towards which it is spring biased (as depicted by an arrow B in FIG. 6) to thereby engage the clutch.

The second embodiment of the invention does not require additional mounting hardware to retain the slave hydraulic cylinder assembly 226 in place. The spring biased clutch arm 224 holds the forward portion 243A of the cylinder 243 in the clutch entranceway 202. An adjustment nut arrangement 261 is included on the piston pull rod 247 (FIGS. 6 and 7) to enable the user to adjust clutch operation as desired.

Thus, the invention provides a hydraulic motorcycle clutch system that can be retrofitted to an existing motorcycle, to pull on the clutch in response to clutch lever movement in the place of a clutch cable. It causes less parasitic drag. It is less prone to degrade. It is easier and more sensitive to operate. It allows clutch lever positioning, immediate clutch response, and unchanged clutch lever feel as the clutch gets hot. It does not require frequent readjustment to compensate for swelling of the clutch plates and for wear. It actually self adjusts. One embodiment includes a slave hydraulic cylinder mounting bracket that mounts on the engine of the YAMAHA YZ400FK1 using nuts that replace existing cylinder head mounting nuts on that engine. Another embodiment mounts on various other models having a clutch arm within a engine case without requiring additional mounting hardware.

Based upon the foregoing description, one of ordinary skill in the art can readily make and use a motorcycle clutch system constructed according to the invention. Although exemplary embodiments have been shown and described, one of ordinary skill in the art may make many changes, modifications, and substitutions without necessarily departing from the spirit and scope of the invention.

What is claimed is:

1. A hydraulic clutch assembly for retrofitting a motorcycle having a handlebar, a clutch lever, a clutch cable, and an engine with a clutch, an engine case, a clutch arm within the engine case that is pulled by the clutch cable to disengage the clutch, and a clutch cable entranceway in the engine case that provides access for the clutch cable to the clutch arm, the hydraulic clutch assembly comprising:

a master cylinder assembly adapted to be mounted on the handlebar of the motorcycle in place of the clutch lever, the master cylinder assembly including a clutch lever portion that is adapted to actuate the master cylinder;

a slave hydraulic cylinder assembly having a first portion and a piston pull rod extending from the first portion, which first portion is adapted to seat within the clutch cable entranceway in the place of the clutch cable with the piston pull rod extending from the first portion to the clutch arm; and a hydraulic line adapted to communicate hydraulic fluid pressure between the master cylinder assembly and the slave hydraulic cylinder assembly so that with the hydraulic clutch assembly installed on the motorcycle with the first portion of the slave hydraulic cylinder assembly seated within the clutch cable entranceway in the place of the clutch cable and the piston pull rod connected to the clutch arm, pulling the clutch lever portion of the master cylinder assembly actuates the slave hydraulic cylinder assembly and causes the piston pull rod to pull on the clutch arm in order to disengage the clutch while the first portion of the slave hydraulic cylinder assembly bears against the engine case to thereby help hold the first portion of the slave hydraulic cylinder in the clutch cable entranceway.

2. A hydraulic clutch assembly as recited in claim 1, wherein the first portion of the slave hydraulic cylinder is adapted to seat within the clutch cable entranceway without requiring additional mounting hardware.

3. A hydraulic clutch assembly as recited in claim 1, wherein the first portion of the slave hydraulic cylinder that seats within the clutch cable entranceway includes an O-ring seal.

4. A motor cycle retro fitted with a hydraulic clutch assembly, comprising:

a motorcycle originally manufactured with a clutch lever, a clutch cable, and an engine with a clutch, an engine case, a clutch arm within the engine case, and a clutch cable entranceway in the engine case that provides access for the clutch cable to the clutch arm;

a master cylinder assembly mounted on the handlebar of the motorcycle in place of the clutch lever, the master cylinder assembly including a clutch lever portion that is adapted to actuate the master cylinder;

a slave hydraulic cylinder assembly having a first portion from which a piston pull rod extends, which first portion is seated within the clutch cable entranceway in the place of the clutch cable with the piston pull rod extending to the clutch arm; and a hydraulic line operatively connected to communicate hydraulic fluid pressure between the master cylinder assembly and the slave hydraulic cylinder assembly so that pulling the clutch lever portion of the master cylinder assembly actuates the slave hydraulic cylinder assembly and causes the piston pull rod to pull on the clutch arm in order to disengage the clutch.

\* \* \* \* \*